Nov. 27, 1956 P. W. MORRISSEY 2,772,038
METERING CONTROL FOR FERTILIZER SPREADERS
Filed Aug. 17, 1953 2 Sheets-Sheet 2
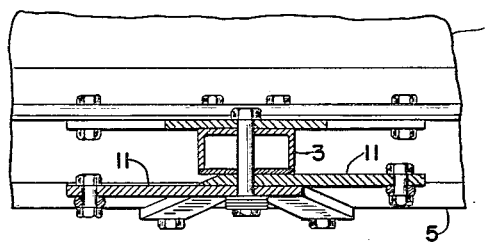
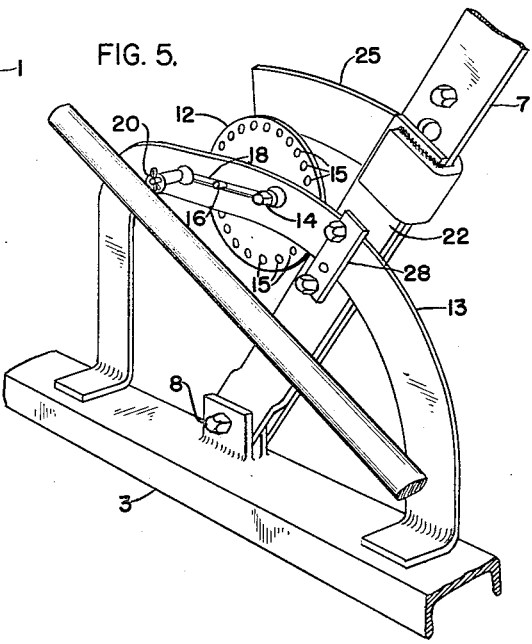
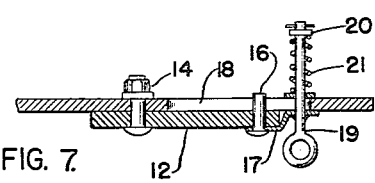
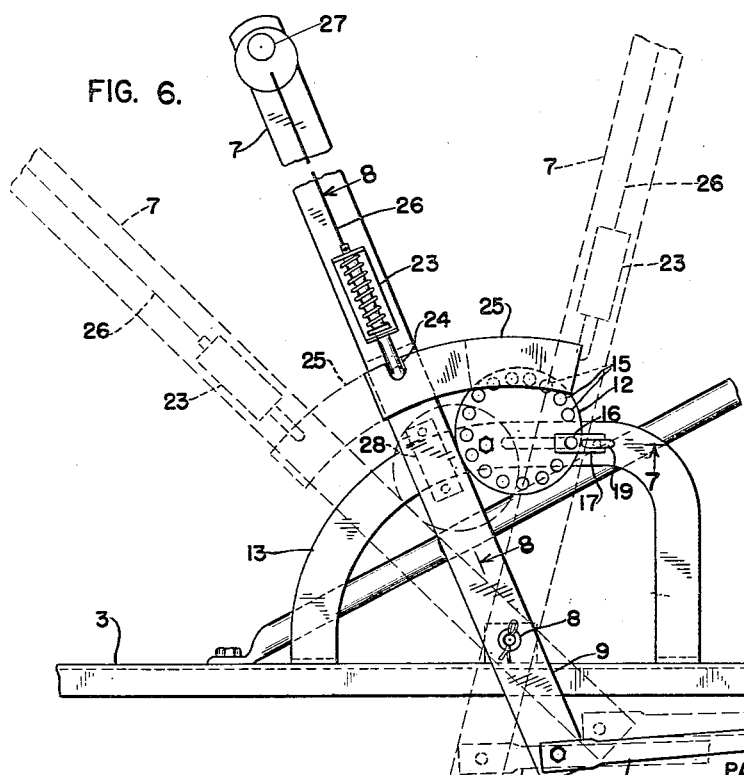
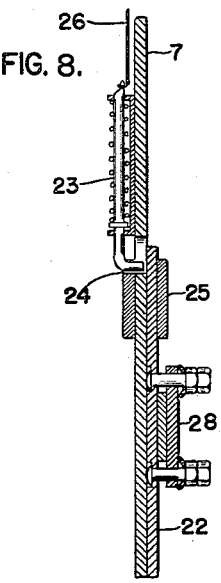
INVENTOR.
PATRICK W. MORRISSEY
BY
ATTORNEYS

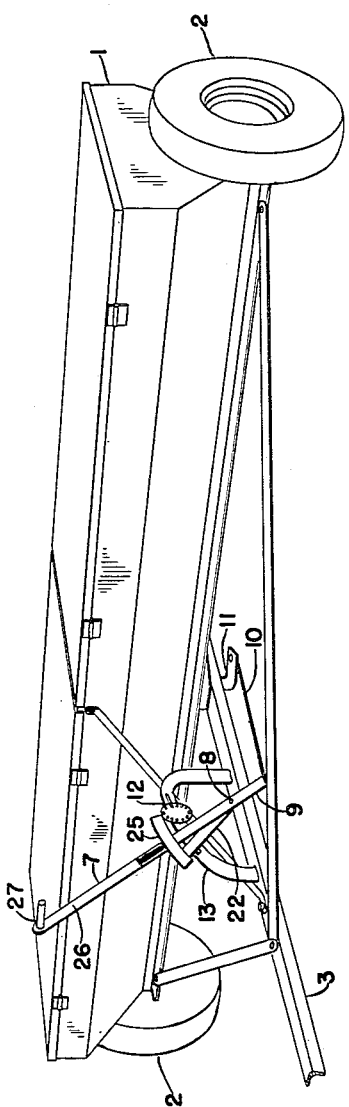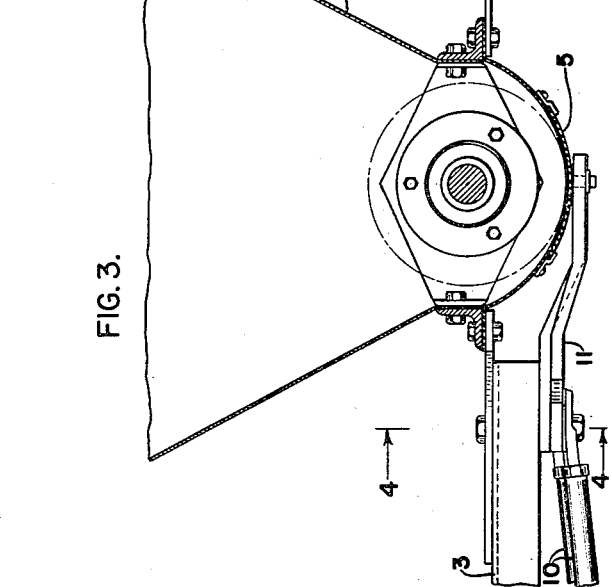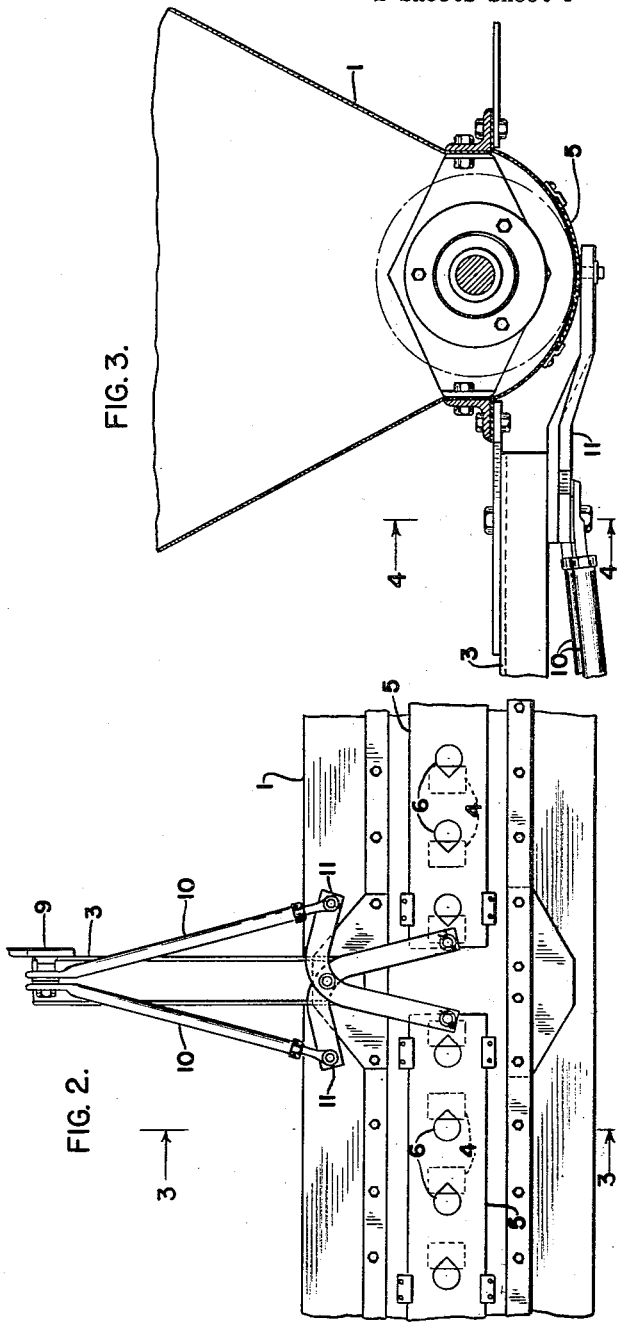

United States Patent Office 2,772,038
Patented Nov. 27, 1956

2,772,038
METERING CONTROL FOR FERTILIZER SPREADERS

Patrick W. Morrissey, Racine, Wis., assignor to J. I. Case Company, Racine, Wis.

Application August 17, 1953, Serial No. 374,523

7 Claims. (Cl. 222—485)

This invention relates to a metering control for fertilizer spreaders and the like.

The invention has been applied to the control of the discharge of fertilizer, lime and other materials from spreaders of the type having a long narrow hopper supported upon end wheels and adapted to be drawn over a field by a tractor or other means. Such spreaders generally have a series of longitudinally spaced discharge openings or ports in the bottom of the hopper with a longitudinally adjustable control plate having a corresponding series of openings or ports which are adapted to register with the first named ports for the maximum discharge rate and to fractionally close off the first named ports for reduced rates of discharge. When the control plate is shifted to fully close off the ports there will be no discharge of material from the hopper.

Spreaders of this type are employed to spread many different materials varying in particle size and in flowability from the hopper. Such a variety of materials require a fine adjustment for the ports in order to accommodate the same and to provide a wide range of feed rates for the spreader.

It has been impossible heretofore with the usual lever adjustment of the detent and quadrant type to provide the desired many small increments of port adjustment.

Furthermore, it is often desirable, as when some of the ports become clogged to provide a control system whereby the ports can be momentarily enlarged to full opening and returned to the original adjustment without difficulty of locating that adjustment.

The present invention provides the desired many small increments of adjustment for the ports and a system wherein a momentary clean-out enlargement of the ports can be accomplished without losing the adjustment.

In carrying out the invention the control lever is normally frictionally biased to a smooth quadrant whereby it remains at any setting, and the discharge ports for the hopper are closed at one extreme position for the lever, and are opened a predetermined selected amount at the other extreme position for the lever, the latter position being adjusted by a metering cam carried by the quadrant and which provides an adjustable stop for lever movement in the direction tending to enlarge the ports.

The momentary clean-out enlargement of the hopper discharge ports is accomplished without destroying the setting of the metering cam, by releasably coupling the lever to a guide quadrant mounted upon an adjacent lever arm that engages the metering cam stop and remains in the position set by the stop while the released lever moves to fully open the discharge ports and returns to initial coupled position adjacent the second lever arm.

The accompanying drawings illustrate the best mode presently contemplated by the inventor for carrying out the invention.

In the drawings:

Figure 1 is a perspective view of a fertilizer spreader embodying the invention;

Fig. 2 is a detail bottom plan view showing the bell crank levers and the port adjusting plates for the hopper;

Fig. 3 is an enlarged detail vertical section taken on line 3—3 of Fig. 2;

Fig. 4 is an enlarged detail vertical section taken on line 4—4 of Fig. 3;

Fig. 5 is an enlarged perspective view of the lever and metering cam control;

Fig. 6 is a side elevation of the lever and metering cam control mechanism showing different positions for the lever;

Fig. 7 is a detail section taken on line 7—7 of Fig. 6 and showing the locking pin for the metering cam; and Fig. 8 is a detail section taken on line 8—8 of Fig. 6, longitudinally of the hand lever.

The spreader comprises in general a fertilizer box or hopper 1 supported for mobility by a pair of wheels 2 disposed at opposite ends of the hopper. A drawbar 3 is secured to the forward side of hopper 1 for attachment to a tractor.

The fertilizer or other materials in the hopper is discharged through a series of longitudinally spaced openings or ports 4 centrally disposed in the bottom of hopper 1.

The size of the ports 4 is adjusted by means of a pair of control plates 5 disposed closely beneath the bottom of the hopper, one plate 5 extending from near the center of the hopper to one end thereof, and the other plate 5 extending from near the center of the hopper to the other end thereof.

Control plates 5 have a series of longitudinally spaced ports 6 therein adapted to register with ports 4 and to cooperate therewith in defining a variably adjustable port size for discharge of material from the hopper, the adjustment being accomplished by longitudinal shifting of plates 5 relative to the hopper whereby ports 6 shift relative to ports 4.

In operation it is desirable to shift control plates 5 in opposite directions from a common lever actuation whereby the forces for shifting the plates are more nearly balanced. The lever mechanism for this purpose is carried by the drawbar 3 and comprises an upwardly extending hand lever 7 pivoted to the drawbar at 8 and having a short lower arm 9 connected by links 10 to the corresponding laterally extending front ends of a pair of horizontal bell crank levers 11 pivotally carried beneath the drawbar 3 and in turn having their rear ends pivotally connected to the corresponding inner ends of control plates 5.

According to the present invention the hand lever 7 is provided with control means that provide many small increments of adjustment for the combined ports 4—6. For this purpose the forward stop position for hand lever 7 is determined by a minutely adjustable stop member 12, for convenience herein called a metering cam.

A smooth quadrant 13 is carried by drawbar 3 above pivot 8 and serves to guide hand lever 7 in its movement.

Metering cam 12 is shown as a circular plate eccentrically pivoted to the side of quadrant 13, as by the pivot bolt 14, and disposed as a stop for hand lever 7 when the latter is moved forwardly. Rotational adjustment of the circular cam plate 12 upon its pivot 14 varies the stop position for hand lever 7.

Metering cam 12 is selectively secured in any one of its adjusted positions by providing a substantial number of circumferentially spaced detent openings 15 therein and employing a detent pin 16 carried by quadrant 13 and adapted to enter the selected detent opening.

To facilitate rapid adjustment of the metering cam 12, pin 16 is carried by a plate 17 disposed on the opposite side of the cam from quadrant 13. Plate 17 is biased against the metering cam at all times to maintain pin 16 in a selected detent opening 15 and extending into a horizontal slot 18 in quadrant 13.

The biasing of plate 17 as explained above is accomplished by providing a second pin 19 secured to the plate and extending through slot 18, free of the metering cam 12, and having a head 20 on its opposite end in the form of a nut which confines a light coil compression spring 21 on pin 19 between the nut and quadrant 13.

When it is desired to rotate cam 12 to a new position of stop adjustment the operator merely presses the head 20 of the pin 19 against spring 21 thereby withdrawing pin 16 from the detent opening 15, after which the cam is rotated and head 20 released to let spring 21 force pin 16 into a newly selected detent opening 15. Numerals will be marked on the front of metering cam 12 adjacent corresponding detent openings 15 to indicate the relative size of the ports 4—6 or the corresponding rate of discharge of material through the ports for a given selection of detent opening, as may be desired.

In order to provide for clean-out of clogged ports, hand lever 7 is provided with a stop lever 22 which abuts metering cam 12 leaving the hand lever 7 free to continue rearward movement under the control of the operator to open ports 4—6.

Stop lever 22 is pivotally carried by the drawbar 3 at the pivot 8 so as to move in unison with lever 7 in the range of movement between the port closed position and the selected stop position. For this purpose lever 7 is coupled to stop lever 22 by a spring pressed detent 23 normally registering with a notch 24 in the top of a quadrant guide 25 carried by lever 22.

The quadrant guide 25 extends rearwardly from lever 22 to guide lever 7 in the port clean-out movement thereof when detent 23 is withdrawn from notch 24.

Detent 23 is actuated by a pull wire 26 extending upwardly therefrom along lever 7 to a rotatable eccentrically mounted handle 27 at the upper end of the lever.

The levers 7 and 22 are normally held in any position within their common range of movement by means of a spring biased brake plate 28 carried by lever 22 and pressing against the smooth side of quadrant 13.

In operation the forward position for levers 7 and 22 effects closing of the ports 4—6. The stop position for levers 7 and 22 wherein the latter lever engages the cam-like outer circumference of metering cam 12 determines the port opening. When it is desired to clean-out clogged ports lever 7 is released from lever 22 by manual turning of handle 27 and removal of detent 23 from notch 24, whereupon the operator can quickly move lever 7 rearwardly to fully open the ports and then return lever 7 to the former stop position where release of handle 27 lets the detent 23 drop into notch 24 thereby locking the port adjustment.

Various modes of carrying out the invention may be employed within the scope of the accompanying claims which particularly point out and distinctly set forth the subject matter regarded as the invention.

I claim:

1. A metering control device for fertilizer spreaders and the like wherein hopper discharge ports are opened and closed by a sliding valve plate having corresponding ports adapted to adjustably register with the hopper discharge ports, comprising a pivotal lever connected to the slide plate to actuate the same, one extreme position of said lever corresponding to a closing of said discharge ports and the opposite extreme position of said lever corresponding to a full opening of said discharge ports, a circular cam abutment plate eccentrically mounted in the path of said lever and adjustably rotatable on an axis parallel to the pivotal axis for the lever to limit the movement of the lever toward said opposite position and thereby determine the adjusted opening of said ports, and means to lock said circular plate in any one of numerous selectable positions to provide fine increments of adjustment for said discharge ports throughout the range of opening of the same.

2. A metering control device for fertilizer spreaders and the like wherein hopper discharge ports are opened and closed by a sliding valve plate having corresponding ports adapted to adjustably register with the hopper discharge ports, comprising a drawbar secured to the hopper, a pivotal hand lever carried by said drawbar, a smooth quadrant carried by said drawbar adjacent said lever, a cam abutment plate pivotally secured to the side of said quadrant in the plane of said lever and with its cam edge facing the lever to limit its movement in the direction of full opening of said ports, and means to lock said cam plate in any one of numerous selectable positions to provide fine increments of adjustment for said discharge ports throughout the range of opening of the same.

3. The construction of claim 2 in which the cam abutment plate is circular and is eccentrically mounted, said plate having a plurality of circumferentially spaced openings therein near the periphery thereof, and said locking means comprises a spring biased detent carried by said quadrant and entering a selected opening in the plate.

4. The construction of claim 2 and means to effect frictional engagement between the lever and quadrant for retaining the lever in any selected position within its range of movement.

5. A metering control device for fertilizer spreaders and the like wherein hopper discharge ports are opened and closed by a sliding valve plate having corresponding ports adapted to adjustably register with the hopper discharge ports, comprising a pivotal lever connected to the slide plate to actuate the same, one extreme position of said lever corresponding to a closing of said discharge ports and the opposite extreme position of said lever corresponding to a full opening of said discharge ports, a cam abutment disposed to limit the movement of said lever from the first position toward the second position, means to lock said cam abutment in any one of numerous selectable positions to provide fine increments of adjustment for said discharge ports throughout the range of opening of the same, and means providing for the movement of said lever past said cam abutment position therefor to the position of full opening of said discharge ports and for the return of said lever to the abutment position while retaining the selective adjustment of said cam by said locking means.

6. The construction of claim 5 in which said lever comprises two adjacent lever arms and said last named means comprises a releasable lock normally securing the arms together to be actuated as a single lever, one of said lever arms being disposed to engage said cam abutment, and the other of said lever arms being free to be moved to the full open position for said discharge ports when said lock is released and while said first lever arm is retained in cam adjusted position against said cam abutment.

7. A metering control device for fertilizer spreaders and the like wherein hopper discharge ports are opened and closed by a sliding valve plate having corresponding ports adapted to adjustably register with the hopper discharge ports, comprising a pivotal lever connected to the slide plate to actuate the same, one extreme position of said lever corresponding to a closing of said discharge ports and the opposite extreme position of said lever corresponding to a full opening of said discharge ports, a circular cam abutment plate eccentrically mounted in the path of said lever to limit the movement of the same toward said opposite position and thereby determine the maximum adjusted opening of said ports, said cam abutment plate having a plurality of circumferentially spaced openings therein near the periphery thereof, and a locking detent disposed to enter a selected opening in the plate to secure the plate in any one of numerous selectable positions to provide fine increments of adjustment for said discharge ports throughout the range of opening of the same.

References Cited in the file of this patent

UNITED STATES PATENTS

| | | |
|---|---|---|
| 1,957,594 | Helm | May 8, 1934 |
| 2,624,492 | Seltzer | Jan. 6, 1953 |
| 2,626,729 | Ajero | Jan. 27, 1953 |
| 2,634,029 | Juzwiak | Apr. 7, 1953 |